(12) United States Patent
Ozaki

(10) Patent No.: US 8,948,507 B2
(45) Date of Patent: Feb. 3, 2015

(54) IMAGE SCANNING APPARATUS, IMAGE PROCESSING APPARATUS, AND NON-TRANSITORY COMPUTER-READABLE RECORDING MEDIUM

(71) Applicant: Kazumasa Ozaki, Nagoya (JP)

(72) Inventor: Kazumasa Ozaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 196 days.

(21) Appl. No.: 13/624,455

(22) Filed: Sep. 21, 2012

(65) Prior Publication Data

US 2013/0135691 A1    May 30, 2013

(30) Foreign Application Priority Data

Nov. 30, 2011    (JP) ................... 2011-262427

(51) Int. Cl.
   *G06K 9/00*    (2006.01)
(52) U.S. Cl.
   USPC ........................................ 382/167; 382/162
(58) Field of Classification Search
   None
   See application file for complete search history.

(56) References Cited

U.S. PATENT DOCUMENTS 5,566,252 A * 10/1996 Miyaza .................. 382/298
5,896,470 A *  4/1999 Miyaza .................. 382/298
2005/0195446 A1 *  9/2005 Kasatani ................. 358/402
2005/0238205 A1 * 10/2005 Kimura et al. ........... 382/112
2006/0221402 A1 * 10/2006 Jiang .................... 358/3.22
2011/0228308 A1 *  9/2011 Goldman et al. .......... 358/1.14

FOREIGN PATENT DOCUMENTS

| JP | HEI 10-11528 A | 1/1998 |
| JP | 3181780 B2 | 7/2004 |
| JP | 2004-234261 A | 8/2004 |
| JP | 4209094 B2 | 1/2009 |

* cited by examiner

*Primary Examiner* — Sean Motsinger

(74) *Attorney, Agent, or Firm* — Scully, Scott, Murphy & Presser, PC

(57) ABSTRACT

A controller converts the original image data into converted image data representing a first converted image, analyzes the original image data and counts a number of first characters recognized in the original image represented by the original image data, and analyzes the converted image data and count a number of second characters recognized in the converted image represented by the first converted image data. The controller compares the number of first characters with the number of second characters and determine which one of the number of first characters and the number of second characters is greater than the other. The controller outputs the original image data when the controller determines that the number of first characters is greater than the number of second characters, and outputs the converted image data when the controller determines that the number of second characters is greater than the number of first characters.

13 Claims, 11 Drawing Sheets

Fig.4

| | BEFORE GROUND COLOR CORRECTION | AFTER GROUND COLOR CORRECTION |
|---|---|---|
| IMAGE EXAMPLE 1 | ABC<br>TEXT TEXT TEXT<br>TEXT TEXT TEXT | TEXT TEXT TEXT<br>TEXT TEXT TEXT |
| IMAGE EXAMPLE 2 | TEXT TEXT TEXT<br>TEXT TEXT TEXT | |

IMAGE SCANNING APPARATUS, IMAGE PROCESSING APPARATUS, AND NON-TRANSITORY COMPUTER-READABLE RECORDING MEDIUM

CROSS REFERENCE TO RELATED APPLICATION

This application claims priority from Japanese Patent Application No. 2011-262427, filed on Nov. 30, 2011, the entire disclosure of which is incorporated herein by reference.

BACKGROUND OF THE INVENTION

1. Field of the Invention

The present invention relates to a technology that makes it easy for a user to recognize the content of an image represented by image data.

2. Description of Related Art

A known image scanning apparatus is configured to correct a ground color of an image represented by image data by applying a correction coefficient to each pixel value of the image data.

SUMMARY OF THE INVENTION

When a ground color of an image is corrected by processing image data of the image, there may be a case where readability of the image is degraded.

Therefore, a need has arisen for an image scanning apparatus and an image processing apparatus that are configured to output an image data while maintaining readability of an image represented by the output image data.

According to an embodiment of the invention, an image scanning apparatus comprises a scanning unit and a controller. The scanning unit is configured to scan a document and generate original image data representing an original image. The controller is configured to convert the original image data into converted image data representing a first converted image, analyze the original image data and count a number of first characters recognized in the original image represented by the original image data, and analyze the converted image data and count a number of second characters recognized in the converted image represented by the first converted image data. The controller is configured to compare the number of first characters with the number of second characters and determine which one of the number of first characters and the number of second characters is greater than the other. The controller is configured to output the original image data when the controller determines that the number of first characters is greater than the number of second characters, and output the converted image data when the controller determines that the number of second characters is greater than the number of first characters.

According to another embodiment of the invention, an image processing apparatus comprises a controller. The controller is configured to obtain original image data representing an original image, convert the original image data into converted image data representing a converted image, analyze the original image data and count a number of first characters recognized in the original image represented by the original image data, and analyze the converted image data and count a number of second characters recognized in the converted image represented by the first converted image data. The controller is configured to compare the number of first characters with the number of second characters and determine which one of the number of first characters and the number of second characters is greater than the other. The controller is configured to output the original image data when the controller determines that the number of first characters is greater than the number of second characters, and output the converted image data when the controller determines that the number of second characters is greater than the number of first characters.

According to another embodiment of the invention, a non-transitory computer-readable recording medium, for use in an image processing apparatus, stores computer readable instructions. The computer readable instructions, when executed by a processor, causes the image processing apparatus to perform obtaining original image data representing an original image, converting the original image data into converted image data representing a converted image, analyzing the original image data and counting a number of first characters recognized in the original image represented by the original image data, analyzing the converted image data and counting a number of second characters recognized in the converted image represented by the first converted image data, comparing the number of first characters with the number of second characters and determining which one of the number of first characters and the number of second characters is greater than the other, outputting the original image data when the controller determines that the number of first characters is greater than the number of second characters, and outputting the converted image data when the controller determines that the number of second characters is greater than the number of first characters.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

FIG. 4 is a schematic diagram showing examples of images whose characters after ground color correction become difficult to read for a user.

DETAILED DESCRIPTION OF EMBODIMENTS

Embodiments of the invention and their features and technical advantages may be understood by referring to FIGS. 1-11, like numerals being used for like corresponding parts in the various drawings.

Figure 1:
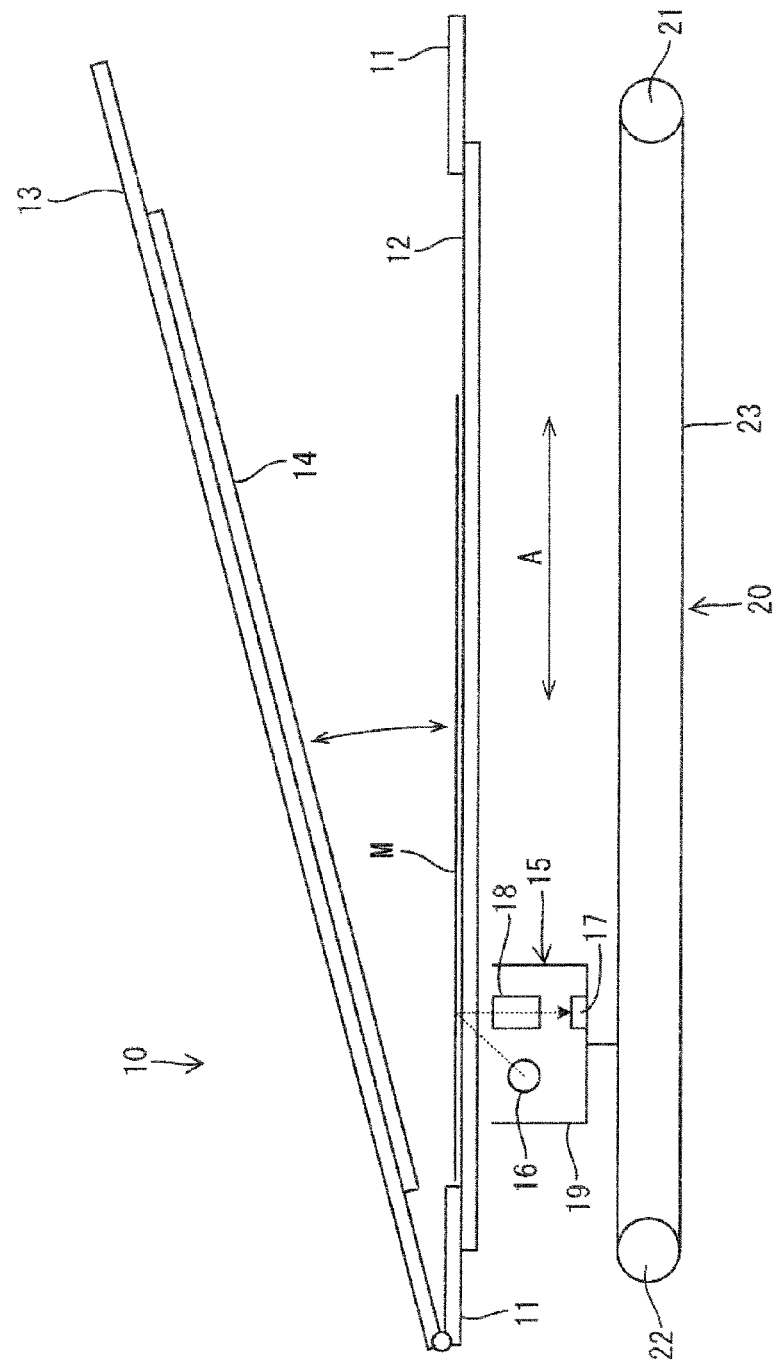
FIG. 1 is a schematic diagram showing the configuration of a scanning of an image scanning apparatus, e.g., an image scanner, according to a first embodiment of the invention.

A first embodiment of the invention will be described below with reference to FIGS. 1 to 7. FIG. 1 is a schematic diagram showing the configuration of a scanning unit 10 of an image scanning apparatus. e.g., an image scanner 1 (see FIG. 2), according to the first embodiment. The following description will be given of the scanning unit 10 of a CIS (Contact Image Sensor) type that scans a document using a one-to-one optical system by way of example. In addition to the configuration shown in FIG. 1, the scanning unit 10 comprises a device controller 34, an AFE (Analog Front End) 35, a driving unit 36 and an image processing unit 37, which will be discussed later referring to FIG. 2.

An opening is formed in the top wall of a housing 11 of the image scanner 1, and is closed by a platen glass 12. FIG. 1 merely shows a part of the housing 11. A document M to be scanned is to be mounted on the platen glass 12. A document cover 13 has a document mat 14 that holds the document M. The document cover 13 is coupled to the housing 11 so as to be rotatable between a closed state to cover the platen glass 12 and an open state to open the platen glass 12.

A scanning device 15 comprises a light source 16, an image sensor 17, a rod lens array 18, and a carriage 19 on which those components are to be mounted. The light source 16 includes three-color (RGB) light emitting diodes. The image sensor 17 has a plurality of light receiving elements aligned linearly in a direction perpendicular to the surface of a sheet plane of FIG. 1 (main scanning direction). The rod lens array 18 leads light reflected at the document M to the individual light receiving elements of the image sensor 17 to form a one-to-one image. The optical system may be a reduction type optical system that forms a document image of a reduced size onto the image sensor 17.

A conveying mechanism 20 comprises a driving roller 21, a driven roller 22 and a timing belt 23 put around the rollers 21 and 22. The conveying mechanism 20 is driven by a driving unit 36 (to be described later) to convey the scanning device 15 in a sub scanning direction (direction A in FIG. 1) parallel to the surface of the platen glass 12.

The scanning device 15 is conveyed in the sub scanning direction by the conveying mechanism 20 to scan the document M line by line while sequentially changing the colors of the light source 16.

Figure 2:
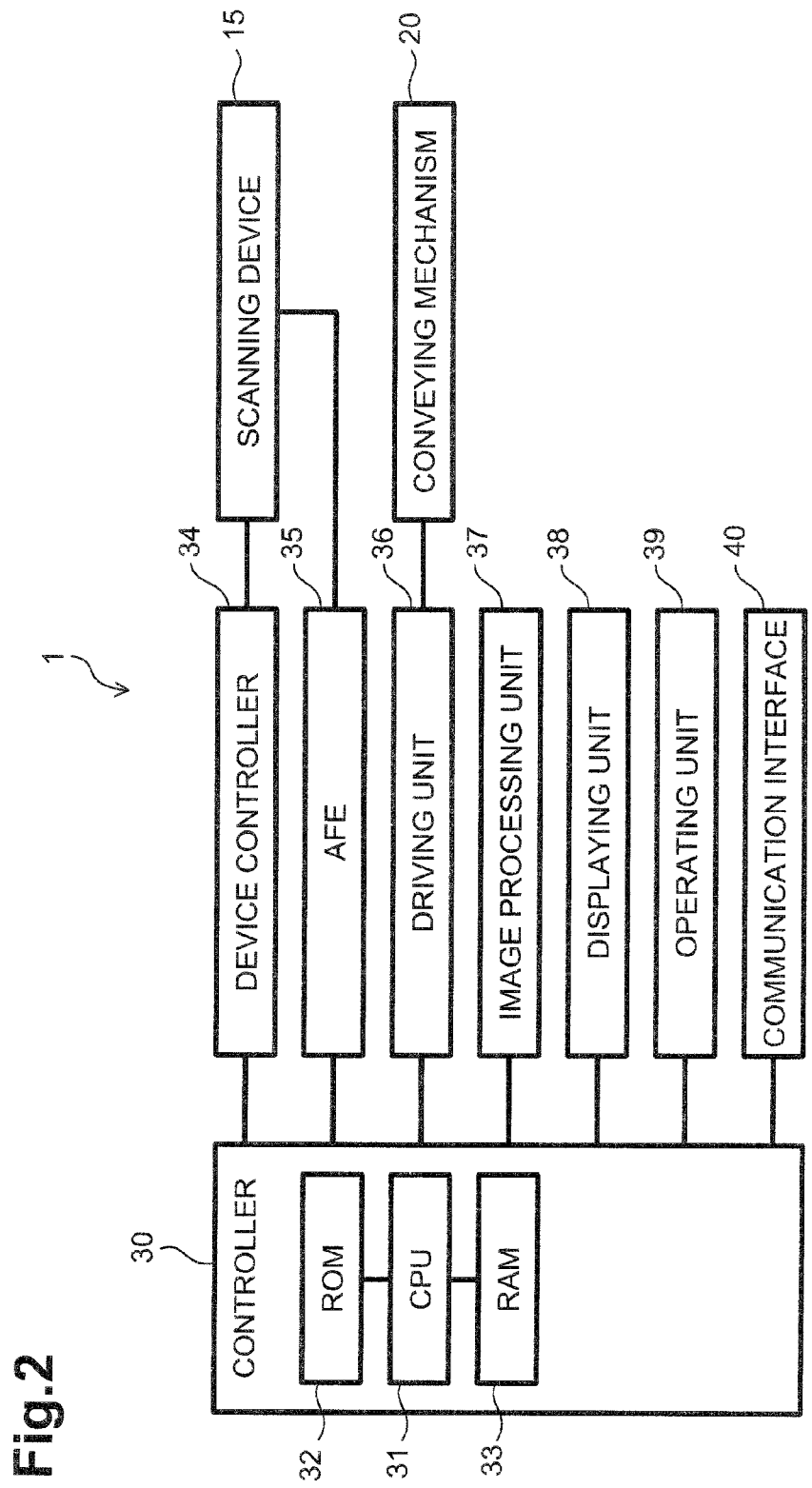
FIG. 2 is a block diagram showing the electrical configuration of the image scanner, according to the first embodiment of the invention.

FIG. 2 is a block diagram showing the electrical configuration of the image scanner 1. The image scanner 1 comprises a controller 30, the device controller 34, the AFE 35, the driving unit 36, the image processing unit 37, a displaying unit 38, an operating unit 39, and a communication interface 40.

The controller 30 comprises a CPU 31, a ROM 32 and a RAM 33. The CPU 31 executes various programs stored in the ROM 32 to control the individual sections of the image scanner 1. The control programs that are executed by the CPU 31, various kinds of data, etc. are stored in the ROM 32. The RAM 33 is used as a main memory for the CPU 31 to execute various processes. The controller 30 is an example of a controller.

The device controller 34 is a circuit to control the light source 16 and the image sensor 17 of the scanning device 15 under control of the controller 30. The AFE 35 is a circuit to perform various processes, such as gain control on an analog signal output from the image sensor 17, and A/D conversion to convert the gain-controlled analog signal to a digital signal. The driving unit 36, which is, for example, a stepping motor, drives the aforementioned conveying mechanism 20.

The image processing unit 37 is a circuit to perform various kinds of image processing including gamma correction and shading correction on the digital signal output from the AFE 35 to generate image data having three-color (ROB) density values for each pixel. The displaying unit 38 comprises a display, e.g., a liquid crystal display, and a driving circuit to drive the display. The displaying unit 38 is an example of a notifying unit.

The operating unit 39 comprises various buttons. A user can make various settings and give a scanning instruction by operating the operating unit 39. The user can also make a setting on whether or not to execute ground color correction to be described later by operating the operating unit 39. The communication interface 40 provides communication with an external apparatus such as a personal computer over a communication network like LAN (Local Area Network), a USB (Universal Serial Bus), or a parallel circuit.

When a text document whose ground color is not white, such as a newspaper, is scanned to generate image data, a user may have difficulty in reading characters on an image represented by the generated image data in some cases due to the non-white ground color. To make it easier for a user to read characters in an image, the image scanner 1 executes ground color correction to make the ground color of an image represented by image data white or closer to white. Making the ground color white or closer to white means an original ground color, which is taken as a reference, is changed to white or a color closer to white than the original ground color. In this embodiment, the density value of the ground color after ground color correction is set greater than the original density value. In the first embodiment, the ground color is corrected to a predetermined ground color which is white.

For ease of understanding, according to the first embodiment, an image represented by image data is assumed to be a monochromatic image. A monochromatic image has same RGB density values for each pixel, so that the following description will be given of the density value of the R component. It is also assumed that the density values can take 256 gradations or gray scales ranging from 0 (black) to 255 (white), according to the first embodiment.

According to the first embodiment, ground color correction is carried out by applying a correction equation represented by the following equations 1 and 2 to the density value (density value of the R component) of each of the pixels forming image data. It is assumed that the density value of the R component after ground color correction is directly used as the density value of the G component and the density value of the B component after ground color correction.

Density Value After Ground Color Correction=Density Value Before Ground Color Correction×Correction Coefficient D   (Equation 1)

Correction Coefficient D=Maximum Density Value/Ground Color Density Value   (Equation 2)

In the equation 2, the maximum density value is the greatest density value each pixel can take, and is 255 according to this embodiment. In the equation 2, the ground color density value is the density value of a pixel representing the ground color in an image represented by image data. In general, characters are written with a certain margin set from the top of a document. It is therefore likely that pixels within a certain range from the top of an image, i.e., pixels in the margin show the ground color. In this respect, the image scanner 1 acquires density values from pixels lying in a certain range from the top of an image, and sets the average value of the acquired density values as a ground color density value. The "certain range" can be determined as suited.

Figure 3:
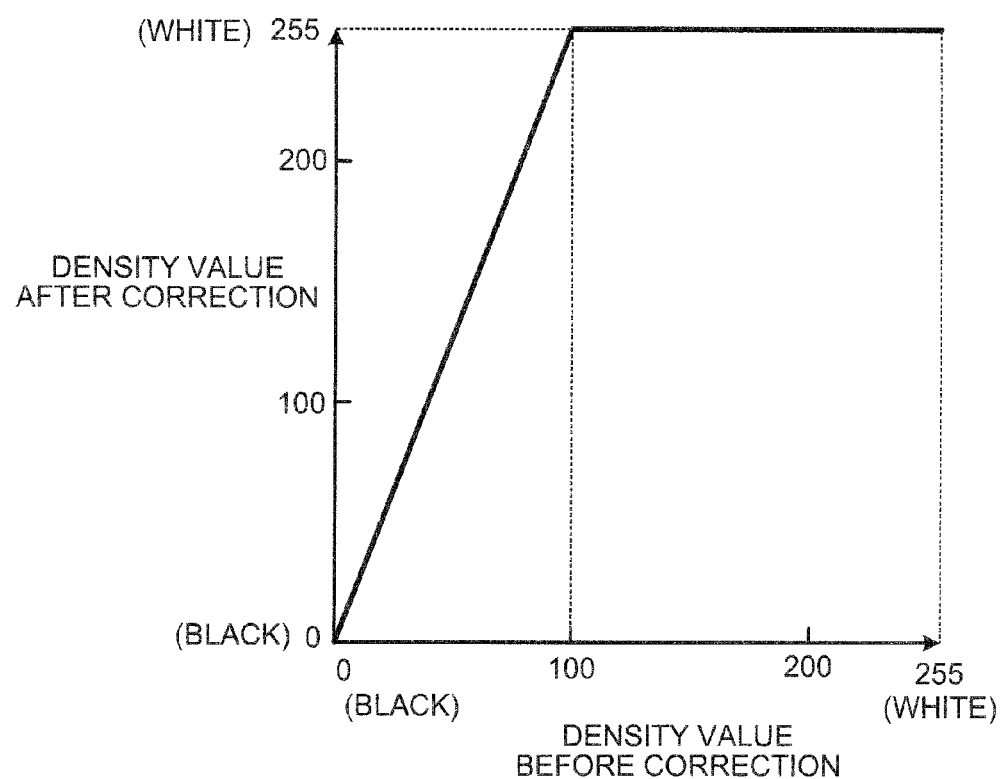
FIG. 3 is a graph showing a change in density value caused by ground color correction, according to the first embodiment of the invention.

FIG. 3 is a graph showing a change in density value caused by the aforementioned ground color correction. The illustrated example shows a case where the ground color density value is 100. The ground color density value of 100 is converted to a density value of white of 255, according to the aforementioned correction equation. That is, the ground color is corrected to white.

It is to be noted however that because the correction equation is applied to all the pixels according to the first embodiment, the pixels whose colors are closer to white than the ground color, i.e., the pixels whose density values are greater than 100, will have density values of over 255 after ground color correction. Therefore, the pixels whose density values are equal to or greater than 100 before ground color correction are all set to have a density value of 255 after ground color correction.

As mentioned above, ground color correction is carried out to make it easier for a user to read characters. However, when the color of characters is closer to white than the ground color, ground color correction when executed causes the characters to disappear, rather making it hard for a user to read the characters. This case will be described below referring to FIG. 4.

FIG. 4 is a schematic diagram showing examples of images whose characters after ground color correction become difficult to read for a user. An image example 1 shows an image represented by image data which is generated by scanning a document whose ground color is gray and whose characters are written in white. When ground color correction is executed on the image example 1, the ground color of gray becomes white, causing the white characters to disappear. Therefore, execution of ground color correction rather makes it difficult for a user to read the characters.

An image example 2 shows an image represented by image data which is generated by scanning a document whose ground color is separated into two colors so that a region where ground color density values are acquired and a region where characters are written have different ground colors. In the illustrated example, the ground color of the region where characters are written is white, and the ground color is closer to white than the color of the characters. Because the ground color density value used in the correction equation is acquired from a region in a certain range from the top of the image, the color of the characters is closer to white as compared to the ground color of this region. Therefore, execution of ground color correction sets both the color of the characters and the ground color to white, causing the characters to disappear.

As mentioned above, there is a case where execution of ground color correction on an image rather makes it difficult for a user to read characters in the image. To cope with such a case, the image scanner 1 executes a character recognition process on both an image represented by image data before ground color correction and an image represented by image data after ground color correction, and determines which is better, the result of recognition of the image before ground color correction or the result of recognition of the image after ground color correction. The image scanner 1 then outputs image data representing whichever image whose recognition result has been determined to be better.

More specifically, the mage scanner 1 compares the number of characters recognized in an image represented by image data before ground color correction (first character number) with the number of characters recognized in an image represented image data after ground color correction (second character number). When the first character number is greater than the second character number, the image scanner 1 determines that the recognition result of the image represented by the image data before ground color correction is better, whereas when the second character number is greater than the first character number, the image scanner 1 determines that the recognition result of the image represented by the image data after ground color correction is better. This is because an image with a greater number of characters recognized in the character recognition process can be said to be an image whose characters are easier to read for a user.

Figure 5:
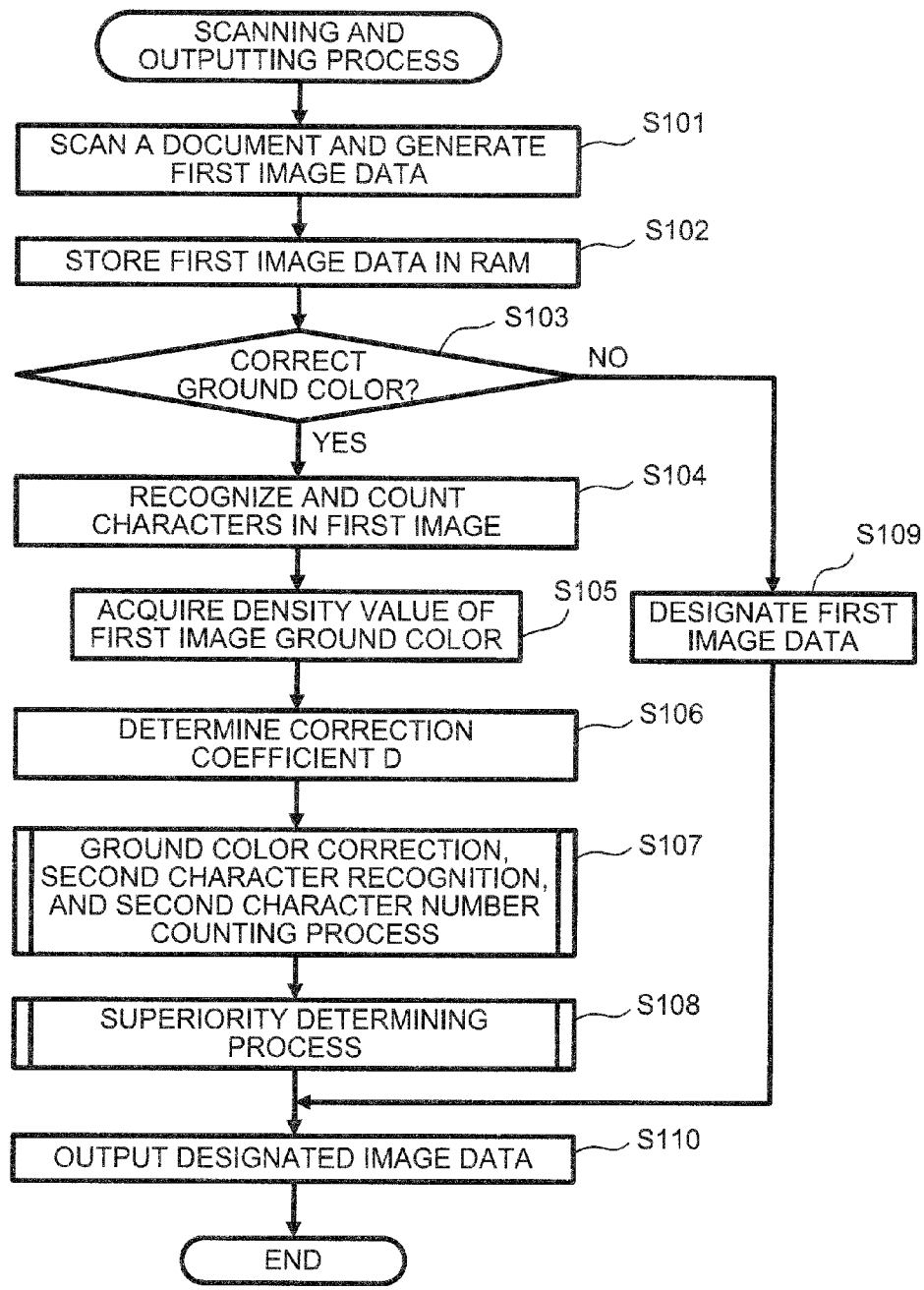
FIG. 5 is a flowchart showing the flow of a scanning and outputting process, according to the first embodiment of the invention.

FIG. 5 is a flowchart showing the flow of a scanning and outputting process, according to the first embodiment. In step 101 (hereinafter, step is abbreviated as S), the controller 30 scans a document and generates original image data, e.g., first image data.

In S102, the controller 30 stores the first image data in the RAM 33. In S103, the controller 30 determines whether the user has made a setting to execute ground color correction. When execution of ground color correction is set (S103: YES), the controller 30 proceeds to S104. When execution of ground color correction is not set (S103: NO), the controller 30 proceeds to S109.

In S104, the controller 30 executes the character recognition process on an image represented by the first image data. The controller 30 analyzes the first image data, and recognizes and counts the number of characters (first character number). In FIG. 5, the image represented by the first image data is simply referred to as "first image".

In S105, the controller 30 analyzes the first image data to acquire a ground color density value indicating the ground color of the document. In S106, the controller 30 determines a correction coefficient D from the ground color density value acquired in S105.

In S107, the controller 30 executes ground color correction on second image data which is a duplication of the first image data, and executes a second character recognition and second character number counting process on an image represented by second image data converted through ground color correction. The details of the ground color correction, second character recognition, and second character number counting process will be given later.

In S108, the controller 30 executes a superiority determining process to determine which one of the recognition result in S104 and the recognition result in S107 is better than the other. In the superiority determining process whose details will be given later, image data corresponding to the recognition result which has been determined to be better is designated as an output target.

In S109, the controller 30 designates the first image data as an output target. In S110, the controller 30 outputs the image data designated as the output target in S108 or S109. The outputting of the image data may be transmission thereof to an external apparatus, or writing thereof into a removable memory which is detachably mounted in the image scanner 1, or printing thereof by a printer which is configured integrally with the image scanner 1.

Figure 6:
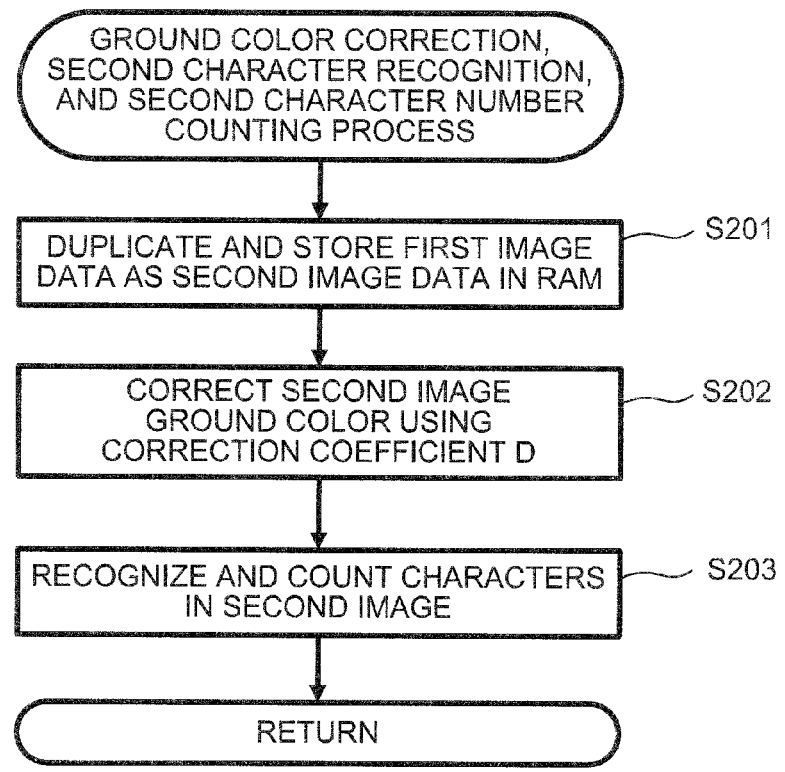
FIG. 6 is a flowchart showing the flow of a ground color correction, second character recognition, and second character number counting process, according to the first embodiment of the invention.

FIG. 6 is a flowchart showing the flow of the ground color correction, second character recognition, and second character number counting process which is executed in S107. In S201, the controller 30 duplicates the first image data and stores it as second image data in the RAM 33.

In S202, the controller 30 executes ground color correction on an image represented by the second image data using the correction coefficient D determined in S106. In S203, the controller 30 executes the character recognition process on an image represented by the second image data converted through the ground color correction, and counts the number of characters recognized in the image represented by the converted second image data (second character number).

Figure 7:
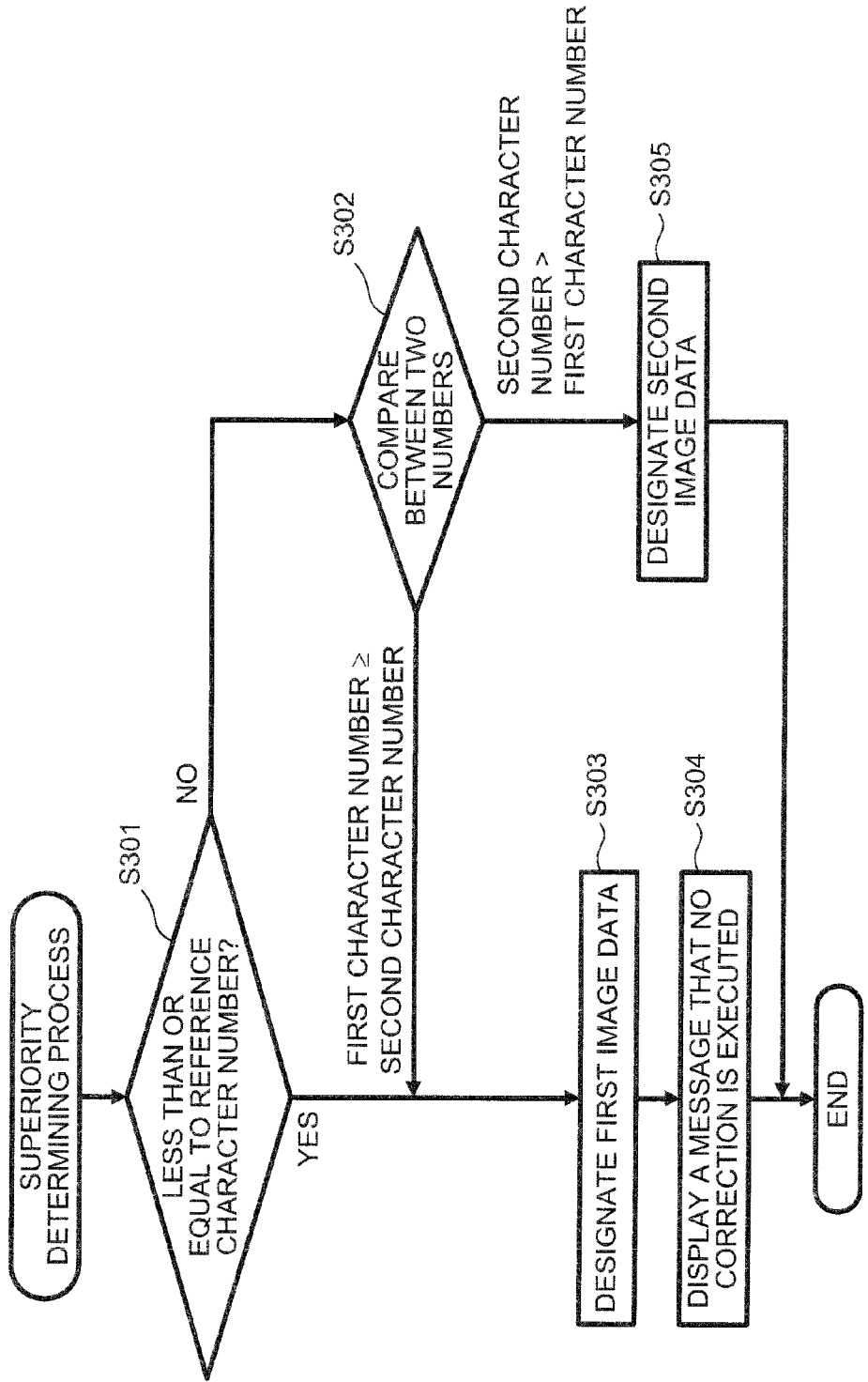
FIG. 7 is a flowchart showing the flow of a superiority determining process, according to the first embodiment of the invention.

FIG. 7 is a flowchart showing the flow of the superiority determining process which is executed in S108. In S301, the controller 30 determines whether the first character number and the second character number are both less than or equal to a reference character number. When at least one of the first character number and the second character number is greater than the reference character number (S301: NO), the controller 30 proceeds to S302. When the first character number and the second character number are both less than or equal to the reference character number (S301: YES), the controller 30 proceeds to S303. In S302, the controller 30 compares the first character number with the second character number. When the first character number is greater than or equal to the second character number, the controller 30 proceeds to S303. When the first character number is less than the second character number, the controller 30 proceeds to S305.

In S303, the controller 30 determines that the recognition result provided by the first character recognition process is better, and designates the first image data as image data to be output. In S304, the controller 30 displays a message that ground color correction has not been executed on the displaying unit 38. In S305, the controller 30 determines that the recognition result provided by the second character recognition process is better, and designates the second image data as image data to be output.

According to the above-described first embodiment, the image scanner 1 outputs image data before ground color correction when it is determined that the recognition result provided by the first character recognition process is better, and outputs image data after ground color correction when it is determined that the recognition result provided by the second character recognition process is better. Accordingly, the image scanner 1 can output whichever image data that makes it easier for a user to recognize the contents of the image, the image data before execution of correction to correct the ground color of the image to white or the image data after execution of the correction.

Further, the image scanner 1 determines that recognition result provided by the first character recognition process is better when the first character number is greater than the second character number, and determines that recognition result provided by the second character recognition process is better when the second character number is greater than the first character number. When there are an original image and an image obtained by correcting the ground color of the original image to white, it can be said that whichever image containing more characters recognized in the character recognition process makes it easier for a user to read the characters. Based on the first character number and the second character number, the image scanner 1 can output whichever image data that makes it easier for a user to read characters, the image data before execution of correction to correct the ground color to white or the image data after execution of the correction.

Furthermore, the image scanner 1 analyzes image data before ground color correction to acquire the ground color density value indicating the ground color of a document, and decides the correction coefficient D for converting the acquired ground color density value to the density value of white. This makes it possible to adequately decide, for each image data, a correction coefficient for correcting the ground color of an image to white.

In addition, the image scanner 1 outputs first mage data which is image data before correction, regardless of the determination in the superiority determining process, when the first character number and the second character number are both less than or equal to the reference character number. If the ground color of an image which does not contain a lot of characters is corrected to white, the image quality may be degraded unnecessarily. However, the image scanner 1 can output image data before correction (first image data) when the first character number and the second character number are both less than or equal to the reference character number, thus making it possible to prevent the quality of an image containing fewer characters from being degraded unnecessarily.

Moreover, when the image scanner 1 outputs image data before correction (first image data), the image scanner 1 notifies a user that ground color correction has not been executed, so that a user can find out that ground color correction has not been executed.

An image scanner according to a second embodiment of the invention will be described below with reference to FIGS. 8 and 9. The description of the first embodiment has been given of the case where the ground color density value is acquired from image data to determine a correction coefficient D. According to the second embodiment, by way of contrast, a plurality of correction coefficients D different from one another are used at the time of making the ground color closer to white and are set beforehand. The ground color correction, second character recognition, second character counting, and superiority determining process are repeated while selecting a correction coefficient D from the correction coefficients D in order, whereby second image data is designated as an output target as much as possible.

It is assumed hereinbelow that N correction coefficients D1, D2, D3, . . . , DN (N≥1) are set beforehand, and the smaller the numeral affixed to "D", the larger the value of the correction coefficient D, and the larger the numeral affixed to "D", the smaller the value of the correction coefficient D. The values of the individual correction coefficients D can be determined as suited.

Because a correction coefficient D affixed with a smaller numeral has a larger value, a correction coefficient D affixed with a smaller numeral demonstrates a greater effect of making the ground color closer to white, and a correction coefficient D affixed with a larger numeral demonstrates a smaller effect of making the ground color closer to white. According to the second embodiment, it is assumed that correction coefficients D are selected in the order of smaller-to-larger affixed numerals. That is, it is assumed that correction coefficients D are selected in the order of a greater-to-smaller effect of making the ground color closer to white. In other words, correction coefficients D are selected among a plurality of predetermined colors, in the order of making the ground color to a darker predetermined color from a lighter predetermined color.

Figure 8:
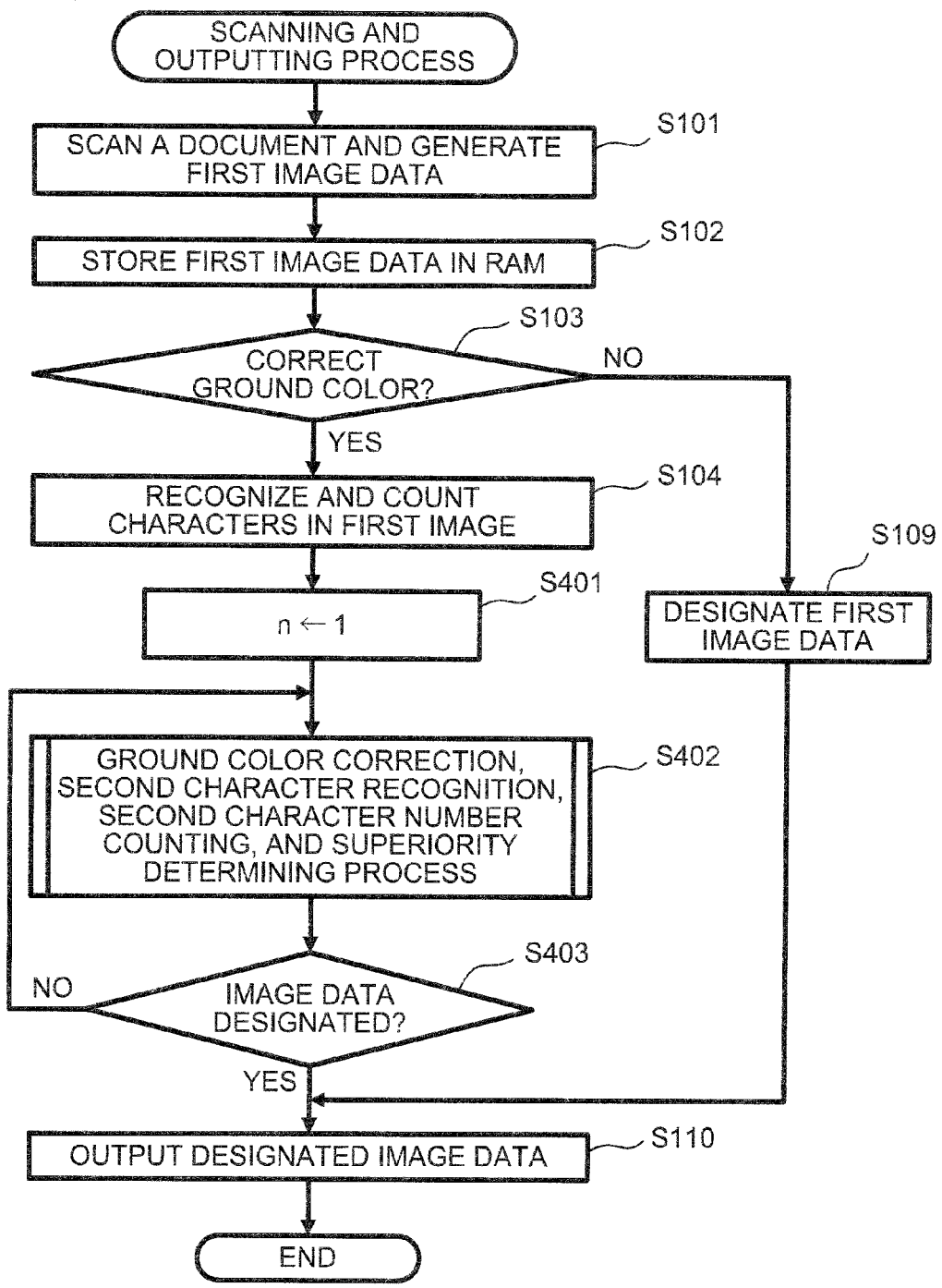
FIG. 8 is a flowchart showing the flow of a scanning and outputting process, according to a second embodiment of the invention.

FIG. 8 is a flowchart showing the flow of a scanning and outputting process, according to the second embodiment. To avoid the redundant description, same reference numerals are given to the processing steps which are substantially the same as the corresponding processing steps of the first embodiment. As mentioned above, correction coefficients D stored in the memory unit beforehand are used in executing ground color correction according to the second embodiment. Therefore, the steps of acquiring a ground color density value from first image data and determining a correction coefficient D (S105 and S106 shown in FIG. 5) are not executed.

In S401, the controller 30 sets "1" to a counter n that counts the number of corrections. In S402, the controller 30 executes a ground color correction, second character recognition, second character number counting, and superiority determining process whose details will be given later. In S402, the controller 30 designates second image data as an output target when the second character number is greater than the first character number, whereas the controller 30 does not designate neither first image data nor second image data as an output target when the first character number is greater than the second character number.

In S403, the controller 30 determines whether image data to be output is designated. When image data to be output is designated (S403: YES), the controller 30 proceeds to S110. When image data to be output is not designated (S403: NO), the controller 30 returns to S402 and repeats the sequence of processes.

Figure 9:
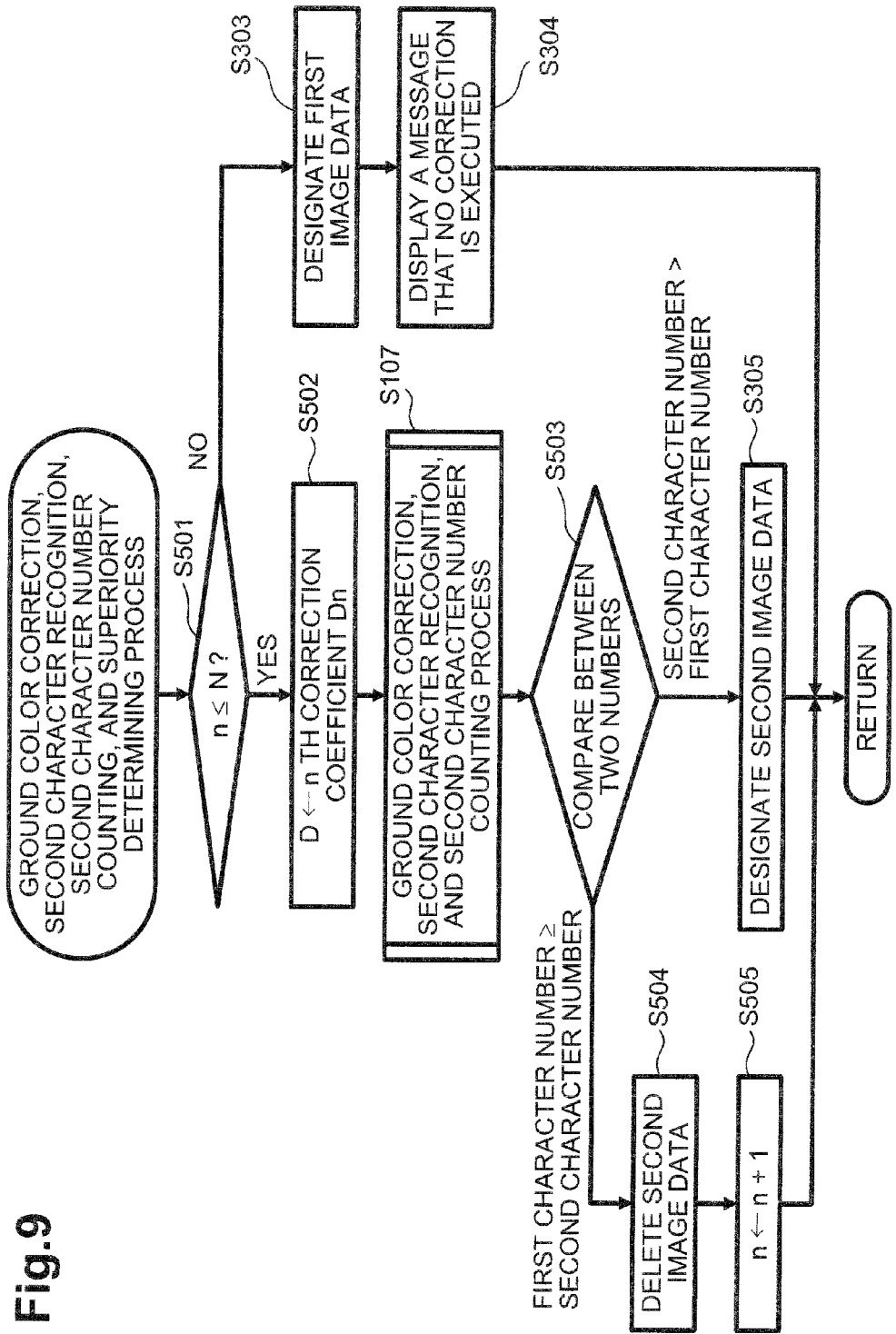
FIG. 9 is a flowchart showing the flow of a ground color correction, second character recognition, and second character number counting, and superiority determining process, according to the second embodiment of the invention.

FIG. 9 is a flowchart showing the flow of the ground color correction, second character recognition, second character number counting, and superiority determining process. To avoid the redundant description, same reference numerals are given to the processing steps which are substantially the same as the corresponding processing steps of the first embodiment.

In S501, the controller 30 determines whether the count of the counter n is equal to or less than N which is the number of the correction coefficients. When the count of the counter n is less than or equal to N (S501: YES), the controller 30 determines that there still is an unselected correction coefficient, and proceeds to S502. When the count of the counter n is greater than N (S501: NO), the controller 30 decides that all of the correction coefficients have been selected, and proceeds to S303. In S502, the controller 30 selects an nth correction coefficient Dn as the correction coefficient D.

In S503, the controller 30 compares the first character number counted in S104 with the second character number counted in S107. When the first character number is greater than or equal to the second character number, the controller 30 proceeds to S504. When the first character number is greater than the second character number, the controller 30 proceeds to S305. In S504, the controller 30 deletes the second image data from the RAM 33. In S505, the controller 30 increments n by "1".

The controller 30 repeats the foregoing ground color correction, second character recognition, second character number counting, superiority determining process until the controller 30 determines that the recognition result provided by the second character recognition process is better, i.e., determines in S503 that the second character number is greater than the first character number, or until the ground color correction is executed N times.

When the controller 30 determines that the recognition result provided by the second character recognition process is better, the second image data is designated as an output target in S305. When the ground color correction is executed N times before the controller 30 determines that the recognition result provided by the second character recognition is better, the controller 30 determines that the recognition result provided by the first character recognition process is better, and designates the first image data as an output target in S303.

According to the above-described second embodiment, the image scanner designates the second image data as an output target as much as possible by repeating the ground color correction, second character recognition, second character number counting, and superiority determining process while selecting the correction coefficients D in order, thereby increasing the possibility of outputting the image data after correction that makes it easier for a user to read characters as compared with image data before correction.

In addition, this image scanner selects a correction coefficient D from a plurality of previously set correction coefficients D different from one another, so that the amount of processing for determining the correction coefficient D can be reduced as compared to the case where image data is analyzed to decide the correction coefficient D.

Further, the image scanner selects the correction coefficients D in the order of a greater-to-smaller effect of making the ground color closer to white. If, for example, the correction coefficients D are selected in the order of a smaller-to-greater effect of making the ground color closer to white, the ground color of an image gradually comes closer to white. In this case, when characters become easier to read for a user than those before correction, there may still be a correction coefficient D which can make the ground color of the image closer to white within the range where the user easily reads characters, i.e., there may still be a correction coefficient D which makes it easier for a user to read characters, but this correction coefficient D is not used.

However, in the second embodiment, because the image scanner selects the correction coefficients D in the order of a greater-to-smaller effect of making the ground color closer to white, i.e., the image scanner selects the correction coefficients D in such a way that the ground color of the image becomes darker gradually, it is possible to make the ground color of the image as close as possible to white within the range where the user easily reads characters.

An image scanner according to a third embodiment of the invention will be described below with reference to FIGS. 10 and 11. The image scanner according to the third embodiment, like the one according to the second embodiment, repeats the ground color correction, second character recognition, second character number counting, and superiority determining process. According to the third embodiment, however, a plurality of correction coefficients D are not set beforehand, and the image scanner acquires the ground color density value from first image data to decide a correction coefficient D, and corrects the ground color using this correction coefficient D in the first ground color correction. In second and subsequent ground color corrections, the image scanner executes the ground color correction while changing the correction coefficient D used in the immediately previous ground color correction according to a predetermined change rule.

The following description will be given of a case where the predetermined changing rule is to decrease the correction coefficient D used in the immediately previous ground color correction by ΔD by way of example. The correction coefficient D decreased by ΔD is an example of a correction coefficient for making the ground color to a second predetermined ground color. The value of ΔD can be determined as suited.

The correction coefficient D is decreased by ΔD to reduce the effect of making the ground color closer to white as compared to the effect provided by the immediately previous ground color correction. If it is not determined, with regard to the second image data whose ground color has been corrected in the immediately previous ground color correction, that the recognition result provided by the second character recognition process is better, this means that the effect of making the ground color closer to white is too great, so that characters become difficult to read. To reduce the effect of making the ground color closer to white in the next ground color correction, the image scanner decreases the correction coefficient D by ΔD.

It is to be noted that the correction coefficient D may be made smaller by multiplying the correction coefficient D used in the immediately previous ground color correction by a value less than "1", not by decreasing the correction coefficient D by ΔD. ΔD need not be always the same, but may be reduced, for example, as the number of ground color corrections increases, or may be increased as the number of ground color corrections increases.

Figure 10:
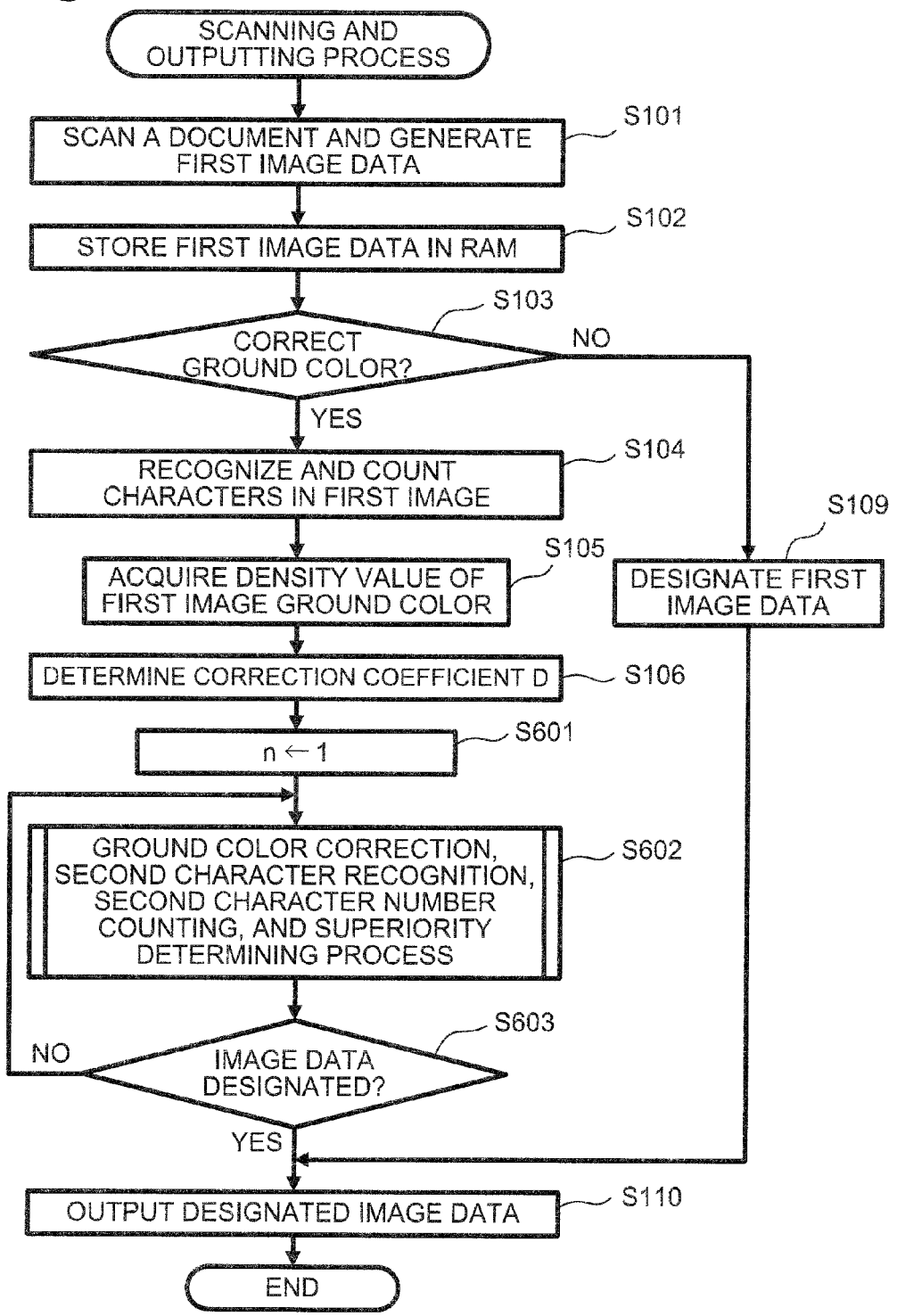
FIG. 10 is a flowchart showing the flow of a scanning and outputting process, according to a third embodiment of the invention.

FIG. 10 is a flowchart showing the flow of a scanning and outputting process, according to the third embodiment. To avoid the redundant description, same reference numerals are given to the processing steps which are substantially the same as the corresponding processing steps of the first embodiment. The scanning and outputting process according to the third embodiment differs from the scanning and outputting process according to the second embodiment in that the correction coefficient to be used in the first ground color correction is determined based on the ground color density value acquired from first image data according to the third embodiment. Therefore, the controller 30 executes acquiring a ground color density value from first image data and determining the correction coefficient D (S105 and S106 shown in FIG. 5).

In S601, the controller 30 sets "1" to the counter n that counts the number of corrections. In S602, the controller 30 executes the ground color correction, second character recognition, second character number counting, and superiority determining process, according to the third embodiment. In S603, the controller 30 determines whether image data to be output is designated. When image data to be output is designated (S603: YES), the controller 30 proceeds to S110. When image data to be output is not designated (S603: NO), the controller 30 returns to S602 and repeats the sequence of processes.

Figure 11:
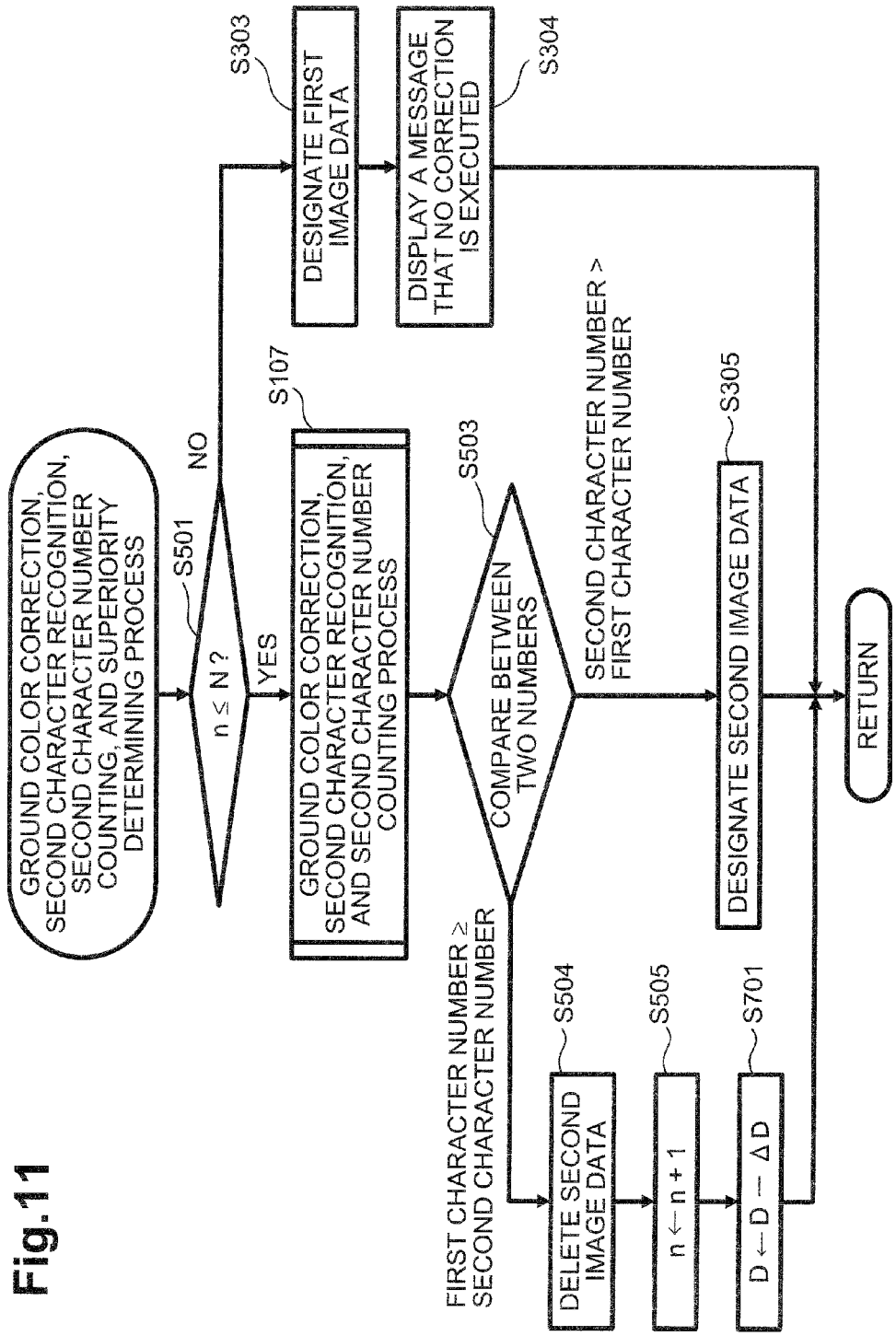
FIG. 11 is a flowchart showing the flow of a ground color correction, second character recognition, and second character number counting, and superiority determining process, according to the third embodiment of the invention.

FIG. 11 is a flowchart showing the flow of the ground color correction, second character recognition, second character number counting, and superiority determining process, according to the third embodiment. To avoid the redundant description, same reference numerals are given to the processing steps which are substantially the same as the corresponding processing steps of the first and second embodiments.

The ground color correction, second character recognition, second character number counting, superiority determining process according to the third embodiment differs from the corresponding process according to the second embodiment in that S502 according to the second embodiment is not executed, and S701 is executed after S505 instead.

In S701, the controller 30 decreases the correction coefficient D by ΔD.

According to the above-described third embodiment, the image scanner designates the second image data as an output target as much as possible by repeating the ground color correction, second character recognition, second character number counting, and superiority determining process while changing the correction coefficient, thereby increasing the possibility of outputting image data after correction that makes it easier for a user to read characters as compared with image data before correction.

Further, this image scanner changes the correction coefficient D in such a way as to reduce the effect of making the ground color closer to white as compared to the effect provided by the correction coefficient D used in the previous ground color correction. If, for example, the correction coefficient D is changed in such a way as to increase the effect of making the ground color closer to white as compared to the effect provided by the correction coefficient D used in the previous ground color correction, the ground color of an image gradually comes closer to white. In this case, when characters become easier to read for a user than those before correction, there may still be a correction coefficient D which can make the ground color of the image closer to white within the range where the user easily reads characters, i.e., there may still be a correction coefficient D which makes it easier for a user to read characters, this correction coefficient D is not used.

However, in the third embodiment, because this image scanner changes the correction coefficient D in such a way as to reduce the effect of making the ground color closer to white as compared to the effect provided by the correction coefficient D used in the previous ground color correction, i.e., the image scanner changes the correction coefficient D in such a way that the ground color of the image becomes darker gradually, it is possible to make the ground color of the image as close as possible to white within the range where the user easily reads characters.

The embodiments are not limited to those described above referring to the accompanying drawings, and following embodiments, for example, shall be encompassed in the technical scope of the invention.

Although the foregoing descriptions of the embodiments have been given of the case where the controller 30 of the image scanner 1 executes the ground color correction, first character recognition, second character recognition, superiority determining, and outputting processes by way of example, those processes may be executed by a personal computer (hereinafter referred to as "PC") that executes, for example, an image processing program. A PC is an example of an image processing apparatus.

Specifically, for example, the image scanner 1 may transmit generated image data to a PC without executing ground color correction. The PC may execute the image processing program to execute the above individual processes, and may output image data which is determined to provide a better recognition result. In this case, outputting image data includes storage of image data in the memory, displaying an image on the display, printing an image by a printer, and transmission of image data to another computer.

It is to be noted that image data is not limited to the one acquired from the image scanner 1, but may be image data acquired from a WEB site on the Internet or image data acquired from a digital camera.

The aforementioned image processing program is not limited to the one that is executed by a PC, but may be executed by a cellular phone or a PDA (Personal Digital Assistant).

Although the foregoing descriptions of the embodiments have been given of the case where an image represented by image data is a monochromatic image, and ground color correction is executed on the density value of the R component by way of example, an image represented by image data may be a color image.

It is to be noted however that the RCB density values of the individual pixels of a color image should not necessarily be the same. In this case, the color space of image data may be converted to YCbCr color space, so that ground color correction is executed using the density value of the Y component. When the density value of the Y component ranges from 0 to 255, 0 represents black and 255 represents white. In this case, it is assumed that only the density value of the Y component is corrected, and the density values of the Cb component and the Cr component are not corrected.

Although the foregoing descriptions of the embodiments have been given of the case where the entire color of an image, not only the ground color but including the color of characters, is made closer to white by way of example, only the ground color may be made closer to white, and other colors than the ground color may not be made closer to white. Specifically, for example, ground color correction may be executed only on pixels which have such density values that the difference between each of the density values and the ground color density value acquired from first image data lies within a predetermined range.

Although the foregoing descriptions of the embodiments have been given of the case where the controller 30 is an example of a controller, a controller may comprise the controller 30 and the image processing unit 37, or only the image processing unit 37 may function as a controller.

Although the foregoing descriptions of the embodiments have been given of the case where white is an example of the predetermined color, the predetermined color may be black when, for example, the ground color is gray and characters are in white.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. An image scanning apparatus comprising:
a scanning unit configured to scan a document and generate original image data representing an original image; and
a controller configured to:
convert the original image data into converted image data representing a converted image,
analyze the original image data and count a number of first characters recognized in the original image represented by the original image data,
analyze the converted image data and count a number of second characters recognized in the converted image represented by the converted image data,
compare the number of first characters with the number of second characters and determine which one of the number of first characters and the number of second characters is greater than the other, and
output the original image data when the controller determines that the number of first characters is greater than the number of second characters, and output the converted image data when the controller determines that the number of second characters is greater than the number of first characters;
wherein the controller is configured to convert the original image data into the converted image data such that a ground color of the original image represented by the original image data is corrected to a predetermined ground color of the converted image represented by the converted image data.

2. The image scanning apparatus according to claim 1, wherein the controller is configured to output the original image data when the controller determines that the number of first characters is equal to the number of second characters.

3. The image scanning apparatus according to claim 1, the controller is configured to:
analyze the original image data and acquire a density value of a ground color of the original image, the density value indicating a ground color of the document, and
determine a correction coefficient such that when the controller converts the original image data into the converted image data by using the correction coefficient, the acquired density value of the ground color of the original image is converted into a density value of the predetermined ground color of the converted image.

4. The image scanning apparatus according to claim 1, wherein the controller is configured to:
determine whether each of the number of first characters and the number of second characters is greater than a reference number, and
output the original image data, regardless of which one of the number of first characters and the number of second characters is greater than the other, when the controller determines that both the number of first characters and the number of second characters are less than or equal to the reference number.

5. The image scanning apparatus according to claim 1, further comprising a notifying unit, wherein when the controller outputs the original image data, the controller is configured to control the notifying unit to notify a user that the original image data remains intact.

6. An image scanning apparatus comprising:
a scanning unit configured to scan a document and generate original image data representing an original image; and
a controller configured to:
convert the original image data into first to Nth converted image data in this order, wherein N is an integer greater than 2,
analyze the original image data and count a number of first characters recognized in the original image represented by the original image data,
each time the controller converts the original image data into one of the first to Nth converted image data, analyze the one of the first to Nth converted image data and count a number of second characters recognized in a corresponding converted image,
compare the number of first characters with the number of second characters and determine which one of the number of first characters and the number of second characters is greater than the other,
output the one of the first to Nth converted image data when the controller determines that the number of second characters is greater than the number of first characters, and
stop converting the original image data once the controller outputs the one of the first to Nth converted image data.

7. The image scanning apparatus according to claim 6, wherein the controller is configured to output the original image data when the controller converts the original image data to the Nth converted image data and determines that the number of first characters is greater than a number of second characters recognized in a corresponding converted image represented by the Nth converted image data.

8. The image scanning apparatus according to claim 6, wherein the controller is configured to convert the original image data into the first to Nth converted image data by using first to Nth correction coefficients, respectively in this order, such that a ground color of the original image is corrected to predetermined ground colors of converted images, respectively.

9. The image scanning apparatus according to claim 8, wherein the controller is configure to store therein the first to Nth correction coefficients.

10. The image scanning apparatus according to claim 8, wherein the controller is configured to obtain each of second to Nth correction coefficients by changing a corresponding immediately previous correction coefficient according to a predetermined rule.

11. The image scanning apparatus according to claim 8, wherein the first to Nth correction coefficients have an effect of correcting the ground color of the original image to a color closer to white, the effect decreasing in an order from the first to Nth correction coefficients.

12. An image processing apparatus comprising:
a controller configured to:
obtain original image data representing an original image,
convert the original image data into converted image data representing a converted image,
analyze the original image data and count a number of first characters recognized in the original image represented by the original image data,
analyze the converted image data and count a number of second characters recognized in the converted image represented by the converted image data,
compare the number of first characters with the number of second characters and determine which one of the number of first characters and the number of second characters is greater than the other, and
output the original image data when the controller determines that the number of first characters is greater than the number of second characters, and output the converted image data when the controller determines that the number of second characters is greater than the number of first characters;
wherein the controller is configured to convert the original image data into the converted image data such that a ground color of the original image represented by the original image data is corrected to a predetermined ground color of the converted image represented by the converted image data.

13. A non-transitory computer-readable recording medium, for use in an image processing apparatus, storing computer readable instructions, the computer readable instructions, when executed by a processor, causing the image processing apparatus to perform:
obtaining original image data representing an original image,
converting the original image data into converted image data representing a converted image,
analyzing the original image data and counting a number of first characters recognized in the original image represented by the original image data,
analyzing the converted image data and counting a number of second characters recognized in the converted image represented by the converted image data,
comparing the number of first characters with the number of second characters and determining which one of the number of first characters and the number of second characters is greater than the other, and
outputting the original image data when the controller determines that the number of first characters is greater than the number of second characters, and outputting the converted image data when the controller determines that the number of second characters is greater than the number of first characters;
wherein the original image data is converted into the converted image data such that a ground color of the original image represented by the original image data is corrected to a predetermined ground color of the converted image represented by the converted image data.

* * * * *